United States Patent
Kestler et al.

(10) Patent No.: US 12,017,779 B2
(45) Date of Patent: Jun. 25, 2024

(54) INTEGRATED MICROWAVE THERMAL ANTI-ICING SYSTEM

(71) Applicant: Rohr, Inc., Chula Vista, CA (US)

(72) Inventors: Steven M. Kestler, San Diego, CA (US); Joseph V. Mantese, Ellington, CT (US); Gurkan Gok, Milford, CT (US)

(73) Assignee: Rohr, Inc., Chula Vista, CA (US)

( * ) Notice: Subject to any disclaimer, the term of this patent is extended or adjusted under 35 U.S.C. 154(b) by 261 days.

(21) Appl. No.: 17/363,409

(22) Filed: Jun. 30, 2021

(65) Prior Publication Data
US 2023/0002064 A1    Jan. 5, 2023

(51) Int. Cl.
| | |
|---|---|
| *B64D 15/00* | (2006.01) |
| *B32B 15/08* | (2006.01) |
| *B64D 33/02* | (2006.01) |
| *H05B 6/64* | (2006.01) |
| *H05B 6/70* | (2006.01) |

(52) U.S. Cl.
CPC ............. *B64D 15/00* (2013.01); *B32B 15/08* (2013.01); *B64D 33/02* (2013.01); *H05B 6/6491* (2013.01); *H05B 6/707* (2013.01); *B32B 2605/18* (2013.01); *B64D 2033/0233* (2013.01); *H05B 2214/02* (2013.01)

(58) Field of Classification Search
CPC ........ B64D 15/00; B64D 33/02; B64D 15/12; B32B 15/08; H05B 6/6491; H05B 6/105; H05B 6/80
See application file for complete search history.

(56) References Cited

U.S. PATENT DOCUMENTS

| | | | | |
|---|---|---|---|---|
| 4,060,212 A | * | 11/1977 | Magenheim | H05B 6/80 219/703 |
| 4,365,131 A | * | 12/1982 | Hansman, Jr. | H05B 6/80 219/709 |
| 5,061,836 A | | 10/1991 | Martin | |
| 5,248,864 A | * | 9/1993 | Kodokian | H05B 6/106 219/649 |

(Continued)

FOREIGN PATENT DOCUMENTS

| | | | | |
|---|---|---|---|---|
| CN | 109050938 A | | 12/2018 | |
| EP | 0350249 A2 | * | 3/1998 | ......... B64D 81/3446 |

(Continued)

OTHER PUBLICATIONS

Espacenet translation of FR-3096658 A1 (Year: 2020).*

(Continued)

*Primary Examiner* — Topaz L. Elliott
*Assistant Examiner* — Ryan C Clark
(74) *Attorney, Agent, or Firm* — Getz Balich LLC

(57) ABSTRACT

An assembly is provided for a structure. This assembly includes a composite skin and a thermal anti-icing system. The composite skin extends between an exterior surface and an interior surface. The thermal anti-icing system includes a susceptor and a waveguide. The susceptor and the waveguide are integrated into the composite skin between the exterior surface and the interior surface. The waveguide is configured to direct microwaves to the susceptor for melting and/or preventing ice accumulation on the exterior surface.

17 Claims, 7 Drawing Sheets

(56) References Cited

U.S. PATENT DOCUMENTS

| | | | | |
|---|---|---|---|---|
| 5,391,430 | A * | 2/1995 | Fabish | H05B 6/80 426/107 |
| 5,553,815 | A * | 9/1996 | Adams | B64D 15/163 244/134 R |
| 5,615,849 | A * | 4/1997 | Salisbury | B64D 15/00 219/679 |
| 5,623,821 | A | 4/1997 | Bouiller | |
| 6,129,314 | A * | 10/2000 | Giamati | B64D 15/163 244/134 A |
| 6,207,940 | B1 * | 3/2001 | Feher | H05B 6/80 219/703 |
| 6,610,969 | B2 | 8/2003 | Feher | |
| 6,642,490 | B2 | 11/2003 | Feher | |
| 6,787,744 | B1 * | 9/2004 | Feher | B64D 15/14 219/703 |
| 8,505,273 | B2 * | 8/2013 | Zhang | H05B 6/80 219/679 |
| 8,997,451 | B2 * | 4/2015 | Dufresne de Virel | B64D 15/00 60/39.093 |
| 9,056,684 | B2 | 6/2015 | McCollough | |
| 9,463,879 | B2 * | 10/2016 | Khozikov | B64D 15/12 |
| 9,469,408 | B1 * | 10/2016 | Elangovan | B64D 33/02 |
| 11,072,094 | B2 * | 7/2021 | Cochran | B29B 13/024 |
| 2003/0006633 | A1 * | 1/2003 | Clothier | A47C 1/12 297/180.12 |
| 2003/0015524 | A1 * | 1/2003 | Feher | B64D 15/12 219/703 |
| 2003/0152766 | A1 * | 8/2003 | Vargo | B32B 7/12 428/343 |
| 2003/0222176 | A1 * | 12/2003 | Garrigus | B64D 15/00 244/134 E |
| 2005/0121437 | A1 * | 6/2005 | Spohn | B32B 27/281 219/635 |
| 2008/0251642 | A1 * | 10/2008 | Boschet | H05B 6/36 244/134 D |
| 2012/0196453 | A1 * | 8/2012 | Alford | H05B 6/80 257/E21.333 |
| 2012/0256053 | A1 * | 10/2012 | McCollough | B64D 15/12 244/134 F |
| 2015/0083863 | A1 * | 3/2015 | Karthauser | F03D 80/40 219/209 |
| 2015/0260047 | A1 * | 9/2015 | Gieras | H05B 1/0236 416/95 |
| 2017/0057618 | A1 * | 3/2017 | Khozikov | B64C 7/02 |
| 2017/0099702 | A1 * | 4/2017 | Redondo Carracedo | H05B 6/06 |
| 2019/0039741 | A1 * | 2/2019 | Farouz-Fouquet | B64D 15/20 |
| 2019/0118955 | A1 | 4/2019 | Porte | |
| 2019/0389589 | A1 * | 12/2019 | Sakala | B64D 15/12 |
| 2021/0129997 | A1 | 5/2021 | Kestler | |
| 2022/0361300 | A1 * | 11/2022 | Hull | H05B 6/105 |

FOREIGN PATENT DOCUMENTS

| | | | | |
|---|---|---|---|---|
| FR | 3096658 | A1 * | 12/2020 | B64D 15/12 |
| GB | 2292422 | A * | 2/1996 | B64D 33/02 |
| WO | 2016091882 | B1 | 6/2016 | |

OTHER PUBLICATIONS

EP search report for EP22182402.2 dated Oct. 31, 2022.
Akinyemi et al., "Design and Development of a 2.4 GHz Slot Antenna", The Pacific Journal of Science and Technology, vol. 18, No. 2, Nov. 2017.
Dan Viza, "Modernizing RF and Microwave Power Applications", Freescale Technology Forum 2014, http://cache.freescale.com/files/training/doc/ftf/2014/FTF-IND-F0408.pdf.
Glenn Oliver, "Low-Loss Materials in High Frequency Electronics and the Challenges of Measurement", Feb. 4, 2015, https://wiki.epfl.ch/thz/documents/Materials%20and%20Measurements%20-%20DuPont%20-%20Feb2015.pdf.
Harbour Industries, "RF Microwave Coaxial Cable", https://www.iewc.com/-/media/iewcglobal/files/literature/us/manufacturers/harbour-industries/rf-microwave-coax-cable-catalog.pdf.

* cited by examiner

INTEGRATED MICROWAVE THERMAL ANTI-ICING SYSTEM

BACKGROUND

1. Technical Field

This disclosure relates generally to a thermal anti-icing system.

2. Background Information

A modern aircraft propulsion system may include a gas turbine engine housed within a nacelle. The nacelle includes an inlet structure for directing incoming air to the gas turbine engine. This inlet structure includes an inlet lip, an inner barrel and an outer barrel. The inlet lip forms a leading edge of the inlet structure. The inner barrel is connected to a radial inner end of the inlet lip, and at least partially forms an outer peripheral boundary of an inlet duct into the aircraft propulsion system. The outer barrel is connected to a radial outer end of the inlet lip, and circumscribes the inner barrel.

Under certain environmental conditions, the inlet lip may be susceptible to ice accumulation. To melt ice that may accumulate on the inlet lip, the inlet structure may be configured with a thermal anti-icing system. A lip skin of the inlet lip, for example, may be configured with an electrical resistance heater. Such an electrical resistance heater may be attached to an interior surface of the lip skin to minimize a thermal conduction path length from the heater to an exterior surface of the lip skin/the inlet lip. While such electrical resistance heaters have various benefits, there is still room in the art for improvement. Damage to the lip skin and the electrical resistance heater arranged therewith following a foreign object impact, for example, may render a portion of or the entire electrical resistance heater inoperable where the damage severs one or more electrical resistance circuits within the electrical resistance heater.

SUMMARY OF THE DISCLOSURE

According to an aspect of the present disclosure, an assembly is provided for a structure. This assembly includes a composite skin and a thermal anti-icing system. The composite skin extends between an exterior surface and an interior surface. The thermal anti-icing system includes a susceptor and a waveguide. The susceptor and the waveguide are integrated into the composite skin between the exterior surface and the interior surface. The waveguide is configured to direct microwaves to the susceptor for melting and/or preventing ice accumulation on the exterior surface.

According to another aspect of the present disclosure, an assembly is provided for an aircraft propulsion system. This assembly includes a nacelle structure and a thermal anti-icing system. The nacelle structure includes a skin that forms an exterior surface of the nacelle structure. The skin is formed by a plurality of layers of material bonded together. The thermal anti-icing system includes a susceptor and a waveguide. The susceptor is formed by at least a portion of a first of the layers of material. The waveguide formed by at least a portion of a second of the layers of material. The waveguide is configured to direct microwaves to the susceptor for melting and/or preventing ice accumulation on the exterior surface.

According to still another aspect of the present disclosure, another assembly is provided for an aircraft propulsion system. This assembly includes a nacelle structure and a thermal anti-icing system. The nacelle structure includes a skin that forms an exterior surface of the nacelle structure. The skin includes a susceptor, a waveguide and a reflector. The thermal anti-icing system is configured to direct microwaves through the waveguide to the susceptor for melting and/or preventing ice accumulation on the exterior surface. The reflector is configured to direct stray microwaves back towards the susceptor.

The thermal anti-icing system may also include a reflector configured to direct stray microwaves back towards the susceptor. The reflector may be formed by at least a portion of a third of the plurality of layers of material.

The composite skin may extend between the exterior surface and the interior surface without interruption.

The susceptor may be arranged between the waveguide and the exterior surface.

The composite skin may include a first layer, a second layer and a third layer between the first layer and the second layer. The first layer may be configured as or otherwise include the susceptor. The second layer may be configured as or otherwise include the waveguide.

The third layer may be configured from or otherwise include microwave transparent material.

The composite skin may include a plurality of layers. A first of the layers may include the susceptor and the waveguide. The waveguide may be laterally spaced from the susceptor within the first of the layers.

A second of the layers may be configured from or otherwise include microwave transparent material.

At least one of the susceptor or the waveguide may be configured from or otherwise include metal.

The susceptor may be configured from or otherwise include fiber reinforcement within a polymer matrix.

The thermal anti-icing system may also include a reflector configured to reflect microwaves travelling away from the susceptor and the exterior surface back towards the susceptor.

The reflector may be integrated into the composite skin between the exterior surface and the interior surface.

The reflector may be arranged between the interior surface and the waveguide.

The reflector may be configured from or otherwise include metal.

The microwaves may be transmitted at a frequency between one gigahertz (1 GHz) and ten gigahertz (10 GHz).

The microwaves may be transmitted at a frequency between forty gigahertz (40 GHz) and eighty gigahertz (80 GHz).

The microwaves may be transmitted at a frequency between twenty gigahertz (20 GHz) and twenty-five gigahertz (25 GHz).

The microwaves may be transmitted at a frequency between one-hundred and fifty gigahertz (150 GHz) and two-hundred gigahertz (200 GHz).

The thermal anti-icing system may also include a microwave source configured to generate the microwaves directed by the waveguide.

The microwave sources may be configured as or otherwise include a magnetron, a klystron, a gyrotron or a solid state source.

The assembly may also include a nacelle inlet structure for an aircraft propulsion system. The nacelle inlet structure may include the composite skin.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
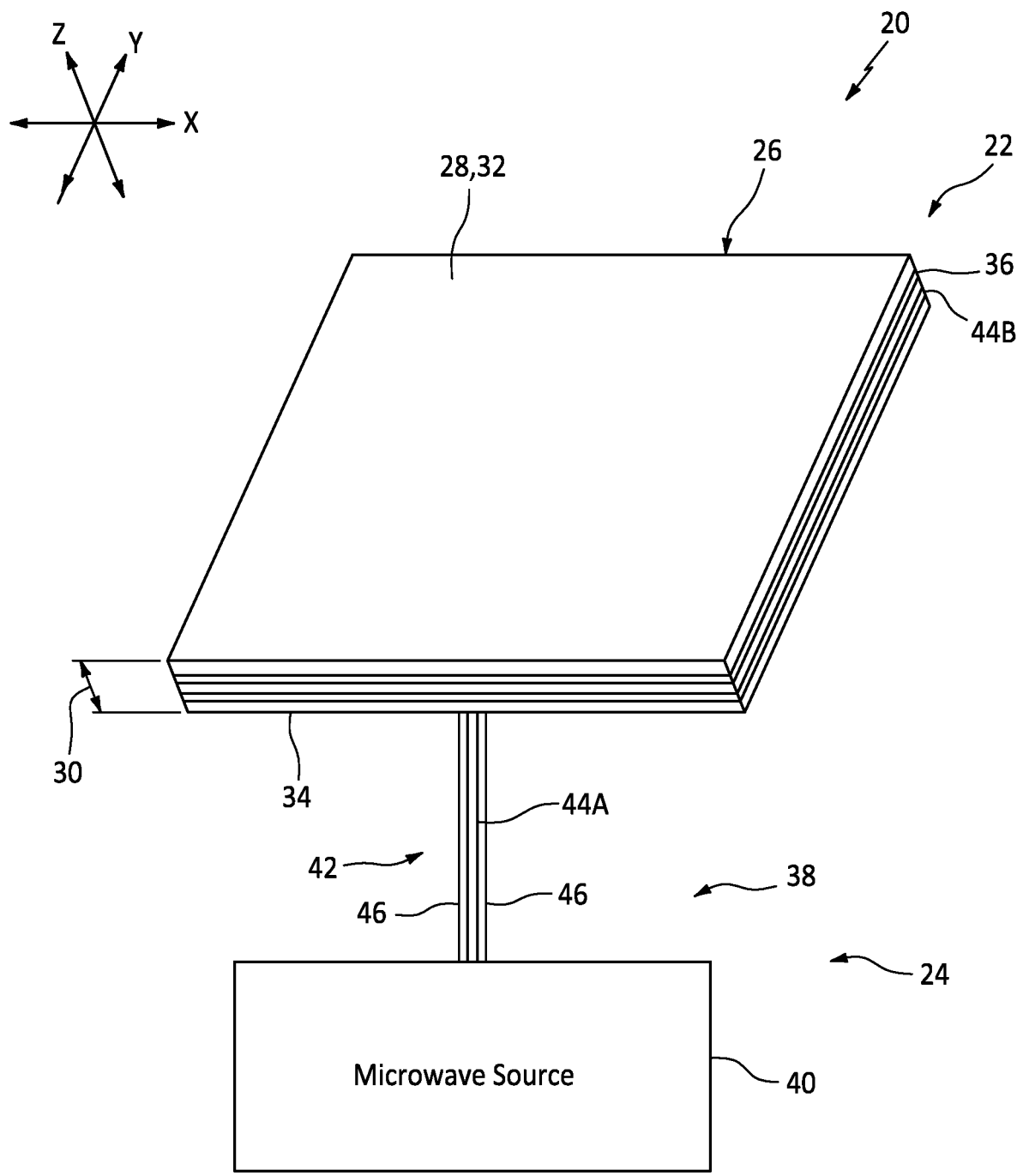
FIG. 1 is a schematic illustration of a portion of an aircraft assembly with an exterior skin and a thermal anti-icing system.

FIG. 1 illustrates an assembly 20 for an aircraft. This aircraft assembly 20 includes an aircraft structure 22 and a microwave thermal anti-icing system 24.

The aircraft structure 22 includes at least one exterior skin 26; e.g., a multi-layered, composite skin. This exterior skin 26 is configured to form an exterior surface 28 of the aircraft structure 22 such as an aerodynamic flow surface. The exterior skin 26, for example, may be configured with a nacelle of a propulsion system for the aircraft; e.g., the aircraft structure 22 may be a nacelle structure. The exterior skin 26, more particularly, may be configured as or otherwise included as part of a noselip of the nacelle. Alternatively, the exterior skin 26 may be configured with another component/structure of the aircraft such as its fuselage or a wing.

The aircraft structure 22 and its exterior skin 26 extend laterally in a first direction (e.g., an x-axis direction) along an x-axis. The aircraft structure 22 and its exterior skin 26 extend laterally in a second direction (e.g., a y-axis direction) along a y-axis. The aircraft structure 22 and its exterior skin 26 extend vertically in a vertical direction (e.g., a z-axis direction) along a z-axis. Note, the term "lateral" may be used herein to generally describe the first lateral direction, the second lateral direction and/or any other direction within the x-y plane. Also note, the term "vertical" may be used herein to describe a depthwise panel direction and is not limited to a gravitational up/down direction. Furthermore, for ease of illustration, the x-y plane is shown as a generally flat plane. However, in other embodiments, the x-y plane and, thus, the aircraft structure 22 and/or its exterior skin 26 may be curved and/or follow an undulating geometry. For example, the x-y plane and, thus, the aircraft structure 22 and/or its exterior skin 26 may be arcuate, cylindrical, conical, frustoconical, or tapered with or without radial undulations. In such embodiments, a solely vertical direction (e.g., z-axis direction) may be defined relative to a position of interest on the x-y plane. For example, on a spherical x-y plane, the vertical direction (e.g., z-axis) direction is a radial direction.

The exterior skin 26 is configured as a relatively thin body that extends laterally within the x-y plane. The exterior skin 26 has a vertical thickness 30. This skin vertical thickness 30 extends vertically between opposing side surfaces 32 and 34 of the exterior skin 26, where the skin exterior surface 32 may form the structure exterior surface 28. The exterior skin body may be solid, non-porous vertically between the skin exterior surface 32 and the skin interior surface 34. Material (s) of the exterior skin 26 may thereby extend between the skin exterior surface 32 and the skin interior surface 34 without any interruptions; e.g., pores, voids, chambers, cavities and/or any other types of apertures. The present disclosure, however, is not limited to such an exemplary solid, non-porous exterior skin configuration.

The thermal anti-icing system 24 is configured to melt and/or prevent ice accumulation on the exterior surface 28, 32. The thermal anti-icing system 24 of FIG. 1 includes at least one susceptor 36 and a microwave system 38.

The susceptor 36 is configured to absorb electromagnetic energy (e.g., microwave radiation, also referred to as "microwaves") and convert that absorbed electromagnetic energy into heat. The susceptor 36, for example, may be configured as a thin layer (or strip, or wire) of material. Examples of the susceptor material may include, but are not limited to: indium tin oxide (ITO); aluminum (Al) or an alloy thereof; ferrous metal such as stainless steel; titanium (Ti) or an alloy thereof; Inconel alloys; chromium (Cr) or an alloy thereof; graphite; composites of metal(s) and ceramic (s) (e.g., cermets); doped silicon carbide; and/or metal oxide(s). Another example of the susceptor material includes (e.g., fiber) reinforcement material within a polymer matrix, where a thickness of the susceptor material may be sized to be about or exactly one-quarter (¼) of the wavelength of the microwaves generated by the microwave system 38. An example of the reinforcement material is fiberglass. An example of the polymer matrix is thermoset epoxy resin. The present disclosure, however, is not limited to the foregoing exemplary susceptor materials.

The microwave system 38 includes a microwave source 40 and a microwave transmission system 42. The microwave source 40 may be configured to generate microwaves at a frequency of, for example, between 2.3 gigahertz (GHz) and 2.6 gigahertz; e.g., at exactly or about (e.g., +/−0.01 or 0.02) 2.45 gigahertz (GHz). Of course, in other embodiments, the microwave source 40 may generate the microwaves at a frequency at or above 2.6 gigahertz and/or at a frequency at or below 2.3 gigahertz. For example, the microwave source 40 may be configured to generate microwaves at a frequency between one and ten gigahertz; e.g., between one and three gigahertz, or more specifically between 2.2 and 2.7 gigahertz for example. The microwave source 40 may also or alternatively be configured to generate microwaves at a frequency between fifteen and thirty gigahertz; e.g., between twenty and twenty-five gigahertz. The microwave source 40 may also or alternatively be configured to generate microwaves at a frequency between forty and eighty gigahertz; e.g., between 60 and 77 gigahertz. The microwave source 40 may also or alternatively be configured to generate microwaves at a frequency between one-hundred and forty (140) and two-hundred and ten (210) gigahertz; e.g., between one-hundred and fifty (150) and two-hundred (200) gigahertz.

The microwave source 40 may be configured as or otherwise include a vacuum electron device (VED) such as, but not limited to, a magnetron, a klystron and a gyrotron. The microwave source 40 may alternatively be configured as or otherwise include a solid state device; e.g., a solid state microwave source. Such a solid state device may include one or more radio-frequency (RF) transistors configured to generate the microwaves. Generally speaking, a solid state device may have some advantages over a vacuum electron device. For example, a solid state device may require less (e.g., 10-100× less) operational power than a vacuum electron device; e.g., 20-50 volts versus 4000 volts. A solid state device may have a longer useful lifetime than a vacuum electron device; e.g., 15-20 plus years versus 500-1000 hours. A solid state device may have a lower mass and, thus, weigh less than a vacuum electron device. A solid state device may have improved control over a vacuum electron device.

The microwave source 40 may be configured to generate a continuous output (e.g., stream) of the microwaves. The microwave source 40 may also or alternatively be configured to generate an intermittent (e.g., pulsed) output of the microwaves.

The microwave transmission system 42 is configured to transmit the microwaves generated by the microwave source 40 to a desired location or locations. The microwave transmission system 42 is further configured to selectively direct the microwaves at/to the susceptor 36 as described below in further detail.

The microwave transmission system 42 of FIG. 1 includes one or more waveguides 44A and 44B (generally referred to as "44"); e.g., electromagnetic feed lines. The upstream waveguide 44A is coupled with the microwave source 40, and is configured to transmit the microwaves generated by the microwave source 40 to the downstream waveguide 44B. The downstream waveguide 44B is configured to direct the microwaves received from the upstream waveguide 44A at/to the susceptor 36. These waveguides 44 may be configured as segments of a common waveguide. Alternatively, the waveguides 44 may be configured as discrete waveguide with common or different configurations.

The waveguides 44 may be configured as dielectric waveguides. Examples of a dielectric waveguide include, but are not limited to, a microstrip, a coplanar waveguide and a stripline. Each waveguide 44, for example, may be configured as a layer (or strip, or wire) of material. This waveguide material may be metal such as, but not limited to, indium tin oxide (ITO). The waveguide material may be a fluoropolymer such as, but not limited to, polytetrafluoroethylene (PTFE) (e.g., Teflon® material) or polyvinylidene fluoride (PVDF). The waveguide material may also or alternatively include other polymeric materials and/or ceramics. The present disclosure, however, is not limited to the foregoing exemplary waveguide materials.

One or more of the waveguides 44 (e.g., the upstream waveguide 44A) may be at least partially or completely covered by an insulating material 46. This insulating material 46 is a microwave resistive material such as, but not limited to, metal or alumina (e.g., $Al_2O_3$) or silica (e.g., $SiO_3$). The present disclosure, however, is not limited to the foregoing exemplary insulating materials.

Figure 2:
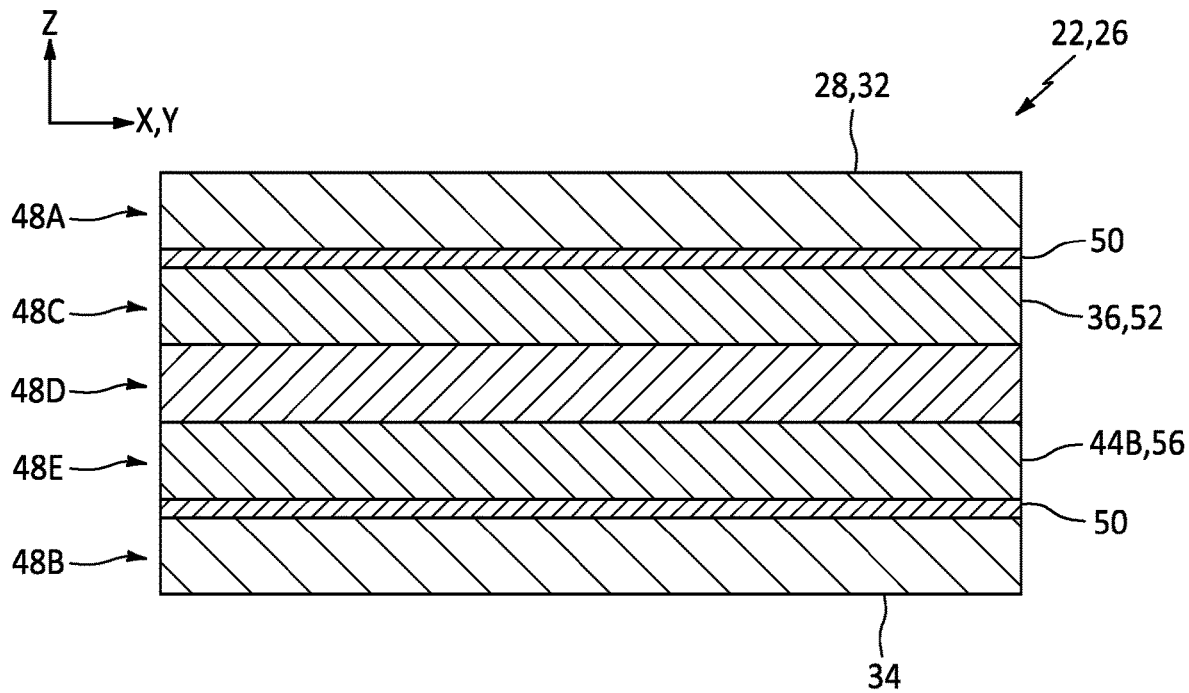
FIG. 2 is a sectional illustration of a portion of the exterior skin configured with a susceptor and a waveguide.

Referring to FIG. 2, the susceptor 36 and the downstream waveguide 44B are each configured with the aircraft structure 22 and its exterior skin 26. The susceptor 36 is also thermally coupled with the exterior surface 28, 32. The susceptor 36 of FIG. 2, for example, is integrated into the exterior skin 26 vertically between the skin exterior surface 32 and the skin interior surface 34. The downstream waveguide 44B of FIG. 2 is also integrated into the exterior skin 26 vertically between the skin exterior surface 32 and the skin interior surface 34, where the downstream waveguide 44B is vertically between the susceptor 36 and the skin interior surface 34.

The exterior skin 26 of FIG. 2 includes a plurality of skin layers 48A-E (generally referred to as "48"); e.g., intra-skin layers. These skin layers 48 are arranged together in a stack to form the exterior skin 26. The skin layers 48 are bonded to one another by an adhesive 50; e.g., a microwave transparent adhesive. Examples of the adhesive 50 may include, but are not limited to, thermoset epoxy resin or any other bonding material with low dielectric loss. The present disclosure, however, is not limited to the foregoing exemplary adhesive materials.

The interior skin layer 48B may form the skin interior surface 34. The exterior skin layer 48A may form the exterior surface 28, 32. The intermediate skin layers 48C-D are arranged sequentially vertically between the other skin layers 48A and 48B.

At least one of the skin layers 48 (e.g., 48C) may at least partially or completely form the susceptor 36. The (e.g., exterior) intermediate skin layer 48C of FIG. 2, for example, forms the susceptor 36. More particularly, the intermediate skin layer 48C of FIG. 2 is (or otherwise includes) the thin layer of the susceptor material that forms the susceptor 36. The susceptor 36 may thereby be located within the exterior skin 26 at (e.g., on, adjacent or proximate) the exterior surface 28, 32. For ease of description, this intermediate skin layer 48C that forms the susceptor 36 may be referred to below as a susceptor layer 52.

Figure 3:
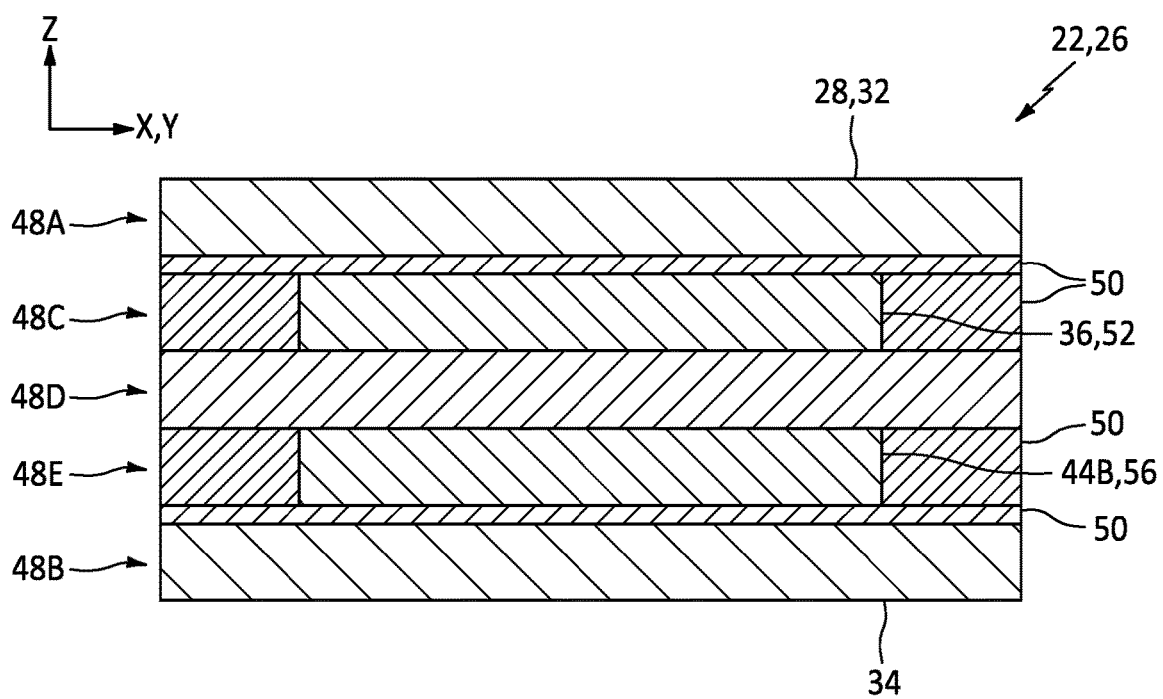
FIGS. 3-6 are sectional illustrations of portions of the exterior skin with various susceptor and waveguide arrangements.
Figure 4:
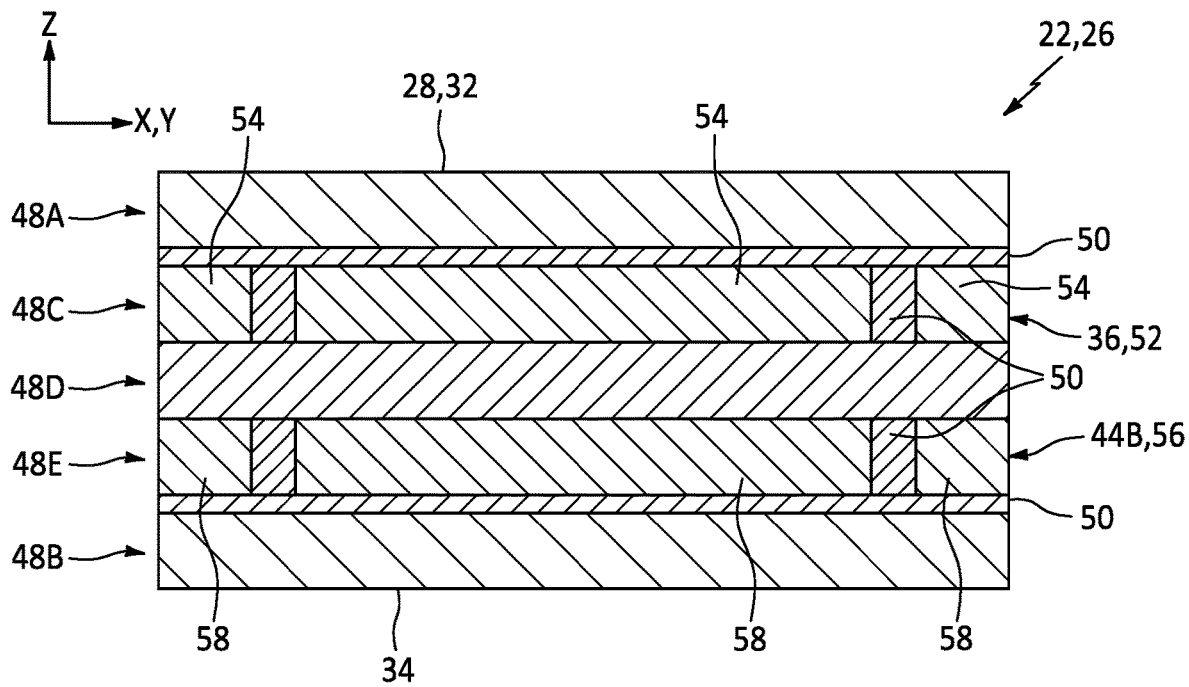

The susceptor 36 of FIG. 2 is configured to laterally overlap (along the x-axis and/or the y-axis) an entirety of the aircraft structure 22, the exterior skin 26 and/or the exterior surface 28, 32. The susceptor 36, for example, may extend along an entire lateral extent of the exterior surface 28, 32. Alternatively, the susceptor 36 may laterally overlap (along the x-axis and/or the y-axis) a select portion of the exterior surface 28, 32. For example, referring to FIG. 3, the susceptor layer 52 may be configured as a strip of material with a lateral width (along the x-axis and/or the y-axis) that is less than a lateral width of the exterior skin 26 and a lateral width of the exterior surface 28, 32. With such an arrangement, thermal anti-icing of the exterior surface 28, 32 may be focused to a select region corresponding to the susceptor 36. In other embodiments, referring to FIG. 4, the susceptor 36 may include one or more (e.g., discrete or interconnected) susceptor segments 54. Each of these susceptor segments 54 may be configured to focus thermal anti-icing to multiple corresponding regions, or provide effective coverage for the entire exterior surface 28, 32.

Referring again to FIG. 2, at least one of the skin layers 48 (e.g., 48E) may at least partially or completely form the downstream waveguide 48B. The (e.g., interior) intermediate skin layer 48E of FIG. 2, for example, forms the downstream waveguide 44B. More particularly, the intermediate skin layer 48E of FIG. 2 is (or otherwise includes) the layer of waveguide material that forms the downstream waveguide 44B. The downstream waveguide 44B may thereby be located within the exterior skin 26 at (e.g., on, adjacent or proximate) the skin interior surface 34. For ease of description, this intermediate skin layer 48E that forms the downstream waveguide 44B may be referred to below as a waveguide layer 56.

The downstream waveguide 44B of FIG. 2 is configured to laterally overlap (along the x-axis and/or the y-axis) the entirety of the aircraft structure 22, the exterior skin 26, the exterior surface 28, 32 and/or the susceptor 36. The downstream waveguide 44B, for example, may extend along the entire lateral extent of the exterior surface 28, 32. Alternatively, the downstream waveguide 44B may laterally overlap (along the x-axis and/or the y-axis) a select portion of the exterior surface 28, 32. For example, referring to FIG. 3, the waveguide layer 56 may be configured as a strip of material with a lateral width (along the x-axis and/or the y-axis) that is less than the lateral width of the exterior skin 26 and the lateral width of the exterior surface 28, 32. In other embodiments, referring to FIG. 4, the downstream waveguide 44B may include one or more (e.g., discrete or interconnected) waveguide segments 58. Each of these waveguide segments 58 may be configured to focus the microwaves to a respective one of the susceptor segments 54.

Referring again to FIG. 2, one or more of the remaining skin layers 48A, 48B and 48D may be configured as structural layers, support layers and/or filler layers. Each of the skin layers 48A and 48B, for example, may be configured as a thin sheet of reinforcement material embedded within (or otherwise arranged with) a matrix. The reinforcement material may include fibrous and/or granular (e.g., powder) material that is transparent to the electromagnetic energy; e.g., the microwave radiation. Examples of the reinforcement material may include, but are not limited to, fiberglass or any other material with low dielectric loss. The matrix material is a bonding material that is also transparent to the electromagnetic energy; e.g., the microwave radiation. This matrix material may be the same type as (or may be) the adhesive 50 (e.g., a microwave transparent adhesive) bonding the skin layers 48 together. In other embodiments, however, the matrix material may be different than, but complementary to for example, the adhesive material. The remaining (e.g., middle, intra-susceptor-waveguide) intermediate skin layer 48D may be configured as a layer of the adhesive 50/the matrix material. Of course, in other embodiments, the intermediate skin layer 48D may alternatively be configured as a thin sheet of the reinforcement material embedded within (or otherwise arranged with) the matrix. The present disclosure, however, is not limited to the foregoing exemplary reinforcement or matrix materials.

Each of the skin layers 48 has a vertical thickness along the z-axis. The susceptor layer 52 vertical thickness may be equal to or different (e.g., less or greater) than the vertical thicknesses of any one or more of the remaining skin layers 48. Generally speaking, the susceptor layer 52 vertical thickness is selected based on a frequency of interest of the electromagnetic radiation. The susceptor layer 52 vertical thickness may also or alternatively be selected to be one-quarter (¼) of a wavelength of the electromagnetic radiation at the frequency of interest. The waveguide layer 56 vertical thickness may similarly be equal to or different (e.g., less or greater) than the vertical thicknesses of any one or more of the remaining skin layers 48. The present disclosure, however, is not limited to such exemplary susceptor and/or waveguide layer vertical thicknesses.

Figure 5:
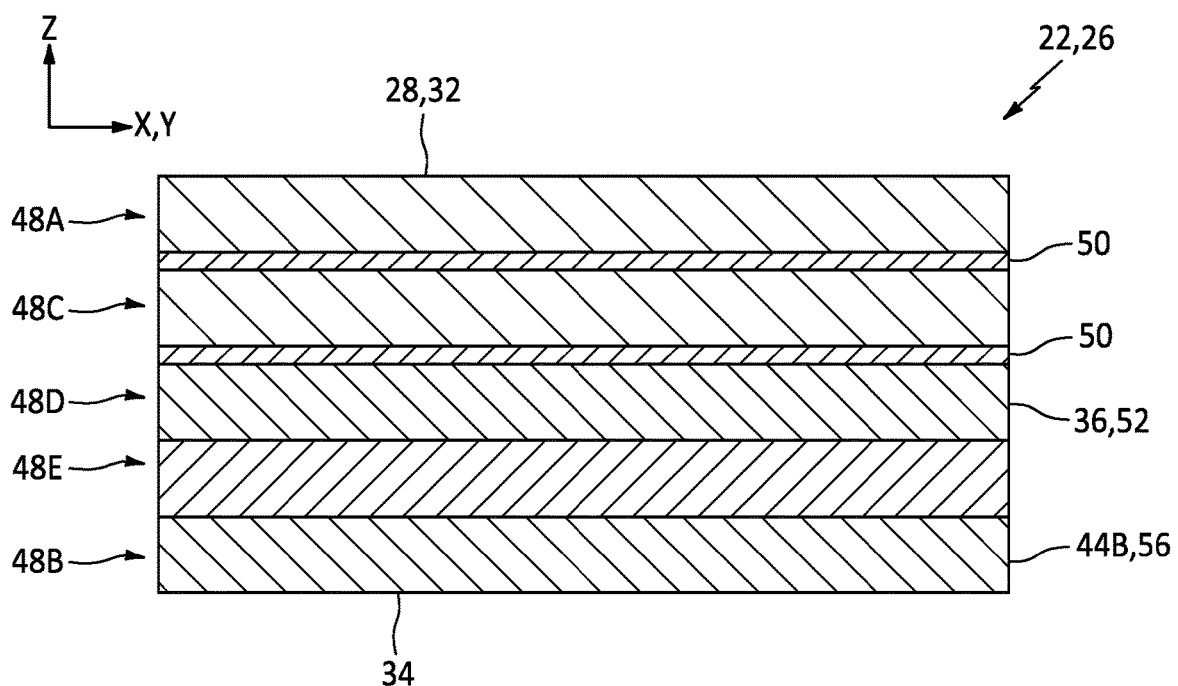
Figure 6:
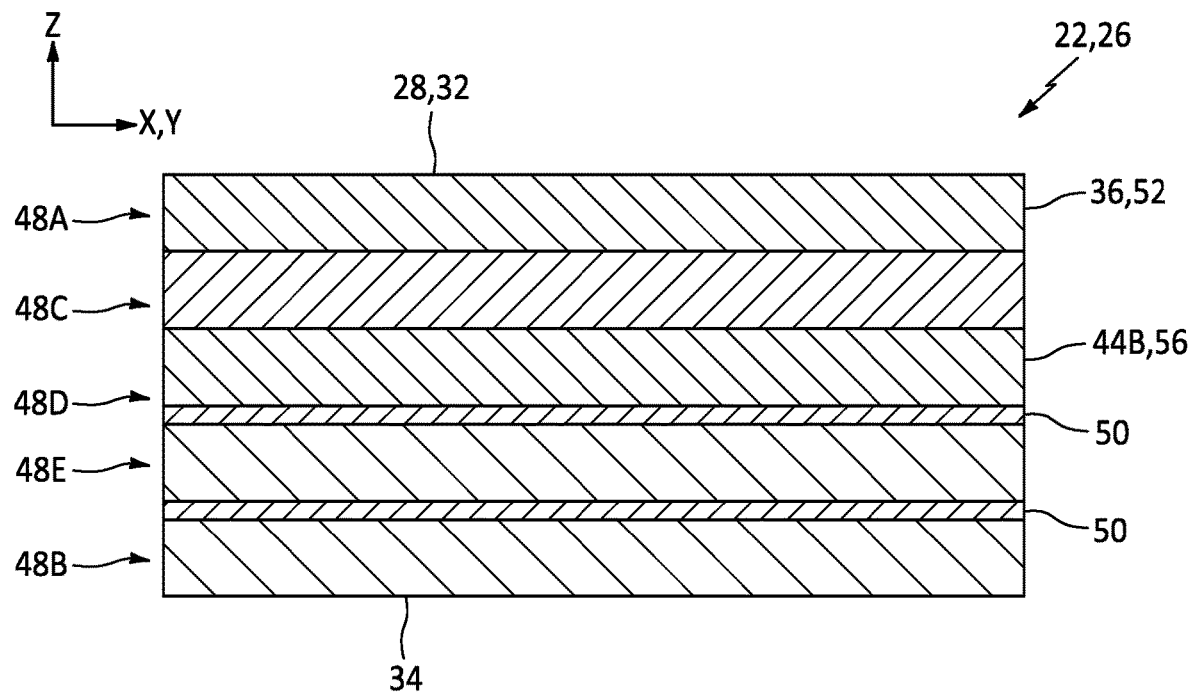

The intermediate skin layer 48C is described above as forming the susceptor 36. The present disclosure, however, is not limited to such an exemplary construction. In some embodiments, for example referring to FIG. 5, the susceptor 36 may alternatively (or also) be formed by another one of the intermediate skin layers (e.g., 48D). In some embodiments, referring to FIG. 6, the susceptor 36 may alternatively (or also) be formed by the exterior skin layer 48A. With each of the foregoing configurations, the susceptor 36 is arranged within the exterior skin 26 vertically between the downstream waveguide 44B and the exterior surface 28, 32.

The intermediate skin layer 48E is described above as forming the downstream waveguide 44B. The present disclosure, however, is not limited to such an exemplary construction. In some embodiments, for example referring to FIG. 6, the downstream waveguide 44B may alternatively (or also) be formed by another one of the intermediate skin layers (e.g., 48D). In some embodiments, referring to FIG. 5, the downstream waveguide 44B may alternatively (or also) be formed by the interior skin layer 48B. With each of the foregoing configurations, the downstream waveguide 44B is arranged within the exterior skin 26 vertically between the susceptor 36 and the skin interior surface 34.

Figure 7:
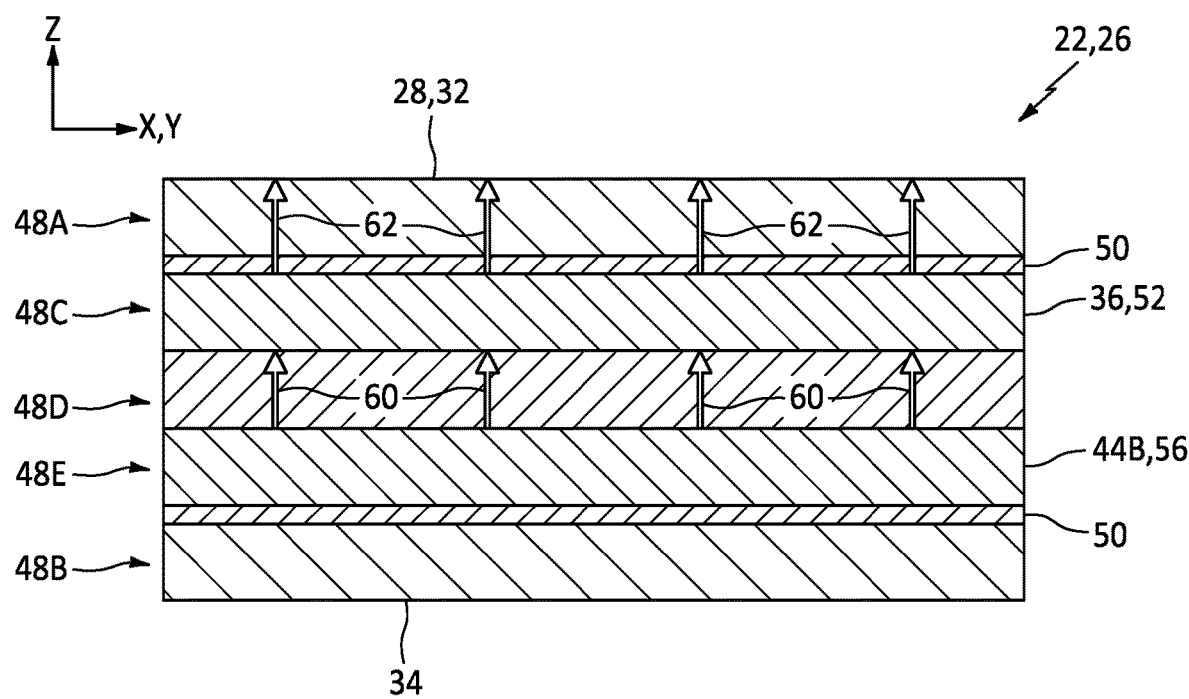
FIG. 7 is a sectional illustration of the exterior skin portion of FIG. 2 during operation of the thermal anti-icing system.

During operation of the thermal anti-icing system 24 of FIG. 1, the microwave source 40 generates microwaves. These microwaves are received by the downstream waveguide 44B through the upstream waveguide 44A. Referring to FIG. 7, the downstream waveguide 44B directs the received microwaves 60 in a first vertical direction towards/to the susceptor 36 through one or more other layers 48 of the exterior skin 26. These transmitted microwaves 60 impinge against and are absorbed by the susceptor 36, and are then transformed by the susceptor 36 into thermal energy 62. This thermal energy 62 may be transferred via conduction from the susceptor 36 into a region of the aircraft structure exterior skin 26 adjacent and/or proximate the susceptor 36. This transfer of the thermal energy 62 may heat the region of the exterior surface 28, 32 and thereby melt and/or prevent ice accumulation over and/or about the aircraft structure exterior skin region.

Figure 8:
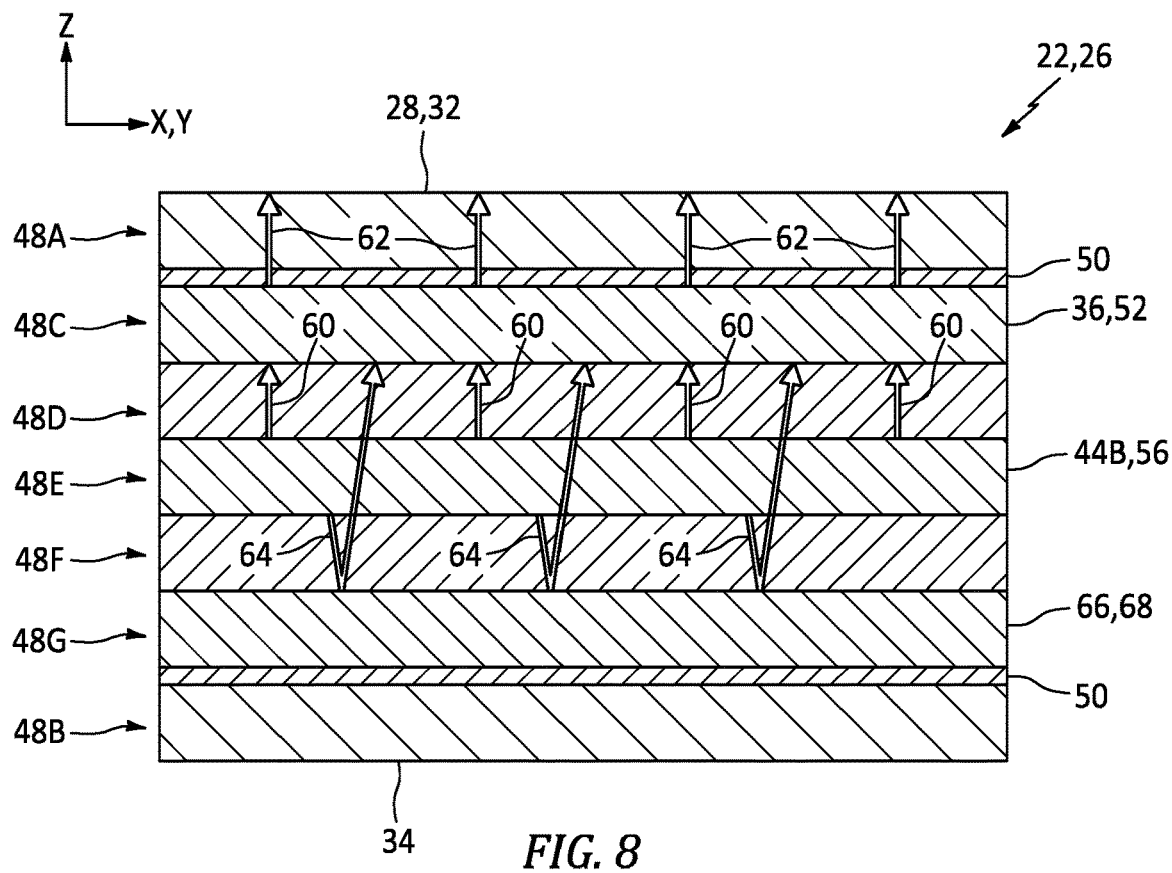
FIG. 8 is a sectional illustration of a portion of the exterior skin further configured with a reflector and depicted during operation of the thermal anti-icing system.

Referring to FIG. 8, the downstream waveguide 44B may also direct some of the received microwaves 64 in a second vertical direction (e.g., opposite the first vertical direction) away from the susceptor 36. The thermal anti-icing system 24 may therefore include a reflector 66. This reflector 66 is configured to reflect (e.g., redirect) the microwaves 64 that are traveling away from the susceptor 36 and the exterior surface 28, 32 back towards/to the susceptor 36. The reflector 66 may thereby utilize/refocus otherwise potentially wasted microwave energy back towards the susceptor 36 to generate additional thermal energy 62. The reflector 66 may therefore increase efficiency of the thermal anti-icing system 24.

The reflector 66 may be configured as a layer (or strip) of material. This reflector material may be metal such as, but not limited to, indium tin oxide (ITO). Typically, the reflector material has a conductance of less than one ohm-per-square inch (1 $\Omega/\text{in}^2$). The present disclosure, however, is not limited to the foregoing exemplary reflector materials or reflector conductance.

The reflector 66 of FIG. 8 is configured with the aircraft structure 22 and its exterior skin 26. The reflector 66 of FIG. 8, for example, is integrated into the exterior skin 26 vertically between the skin exterior surface 32 and the skin interior surface 34, where the reflector 66 is typically vertically between the downstream waveguide 44B and the skin interior surface 34.

The exterior skin 26 of FIG. 8 may have a similar construction as the exterior skin 26 of FIG. 2. However, the exterior skin 26 of FIG. 8 further includes one or more addition intermediate skin layers 48F and 48G (also generally referred to as "48"). At least one of the intermediate skin layers (e.g., 48G) may at least partially or completely form the reflector 66. The intermediate skin layer 48G of FIG. 8, for example, forms the reflector 66. More particularly, the intermediate skin layer 48G of FIG. 8 is (or otherwise includes) the layer of reflector material that forms the reflector 66. The reflector 66 may be located within the exterior skin 26 at (e.g., on, adjacent or proximate) the skin interior surface 34. For ease of description, this intermediate skin layer 48G that forms the reflector 66 may be referred to below as a reflector layer 68.

Figure 9:
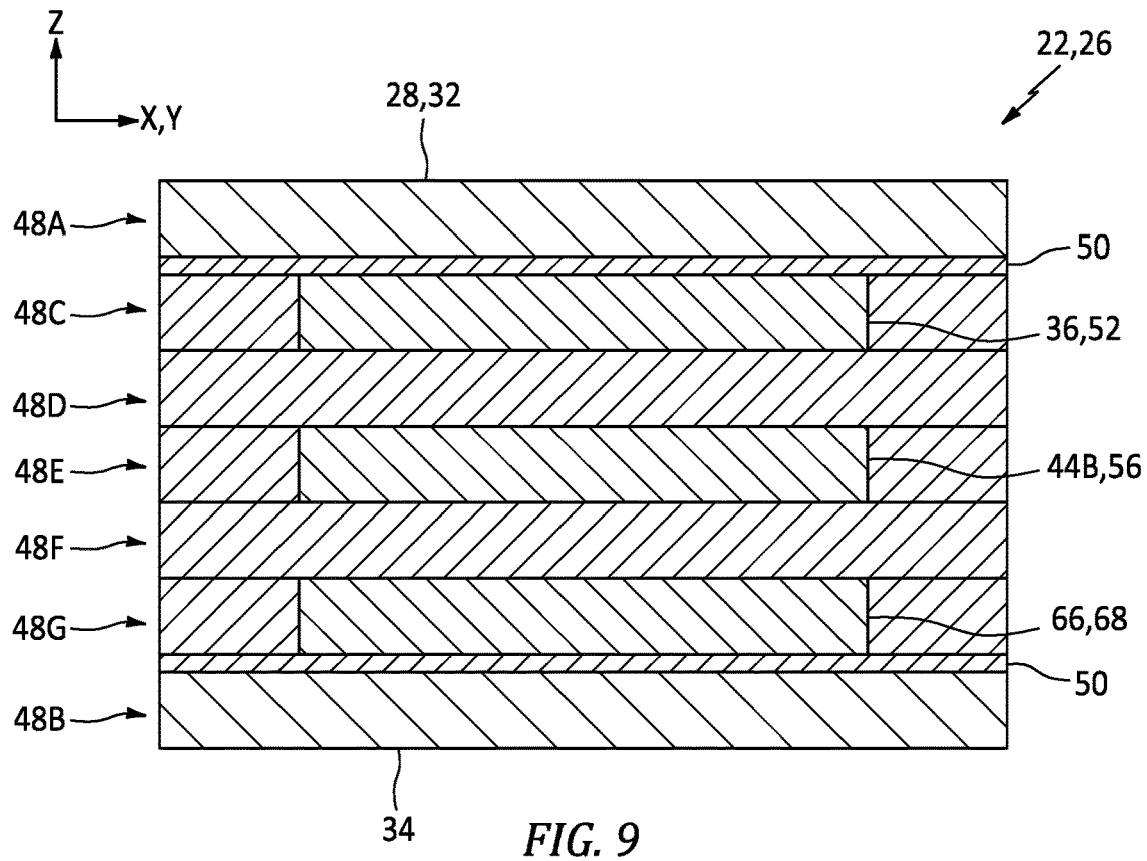
FIGS. 9-11 are sectional illustrations of portions of the exterior skin with various susceptor, waveguide and reflector arrangements.
Figure 10:
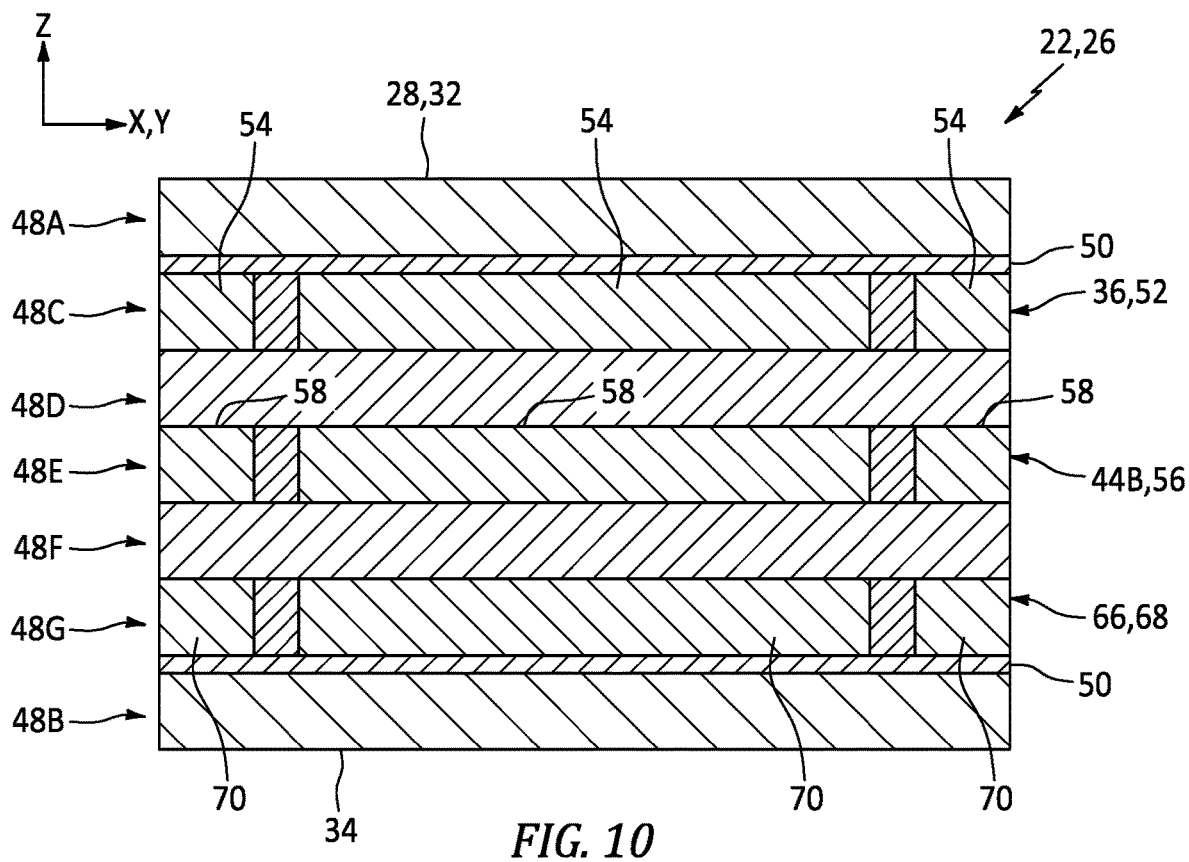

The reflector 66 of FIG. 8 is configured to laterally overlap (along the x-axis and/or the y-axis) the entirety of the aircraft structure 22, the exterior skin 26, the exterior surface 28, 32 and/or one or more other thermal anti-icing system components 36 and 44B. The reflector 66, for example, may extend along the entire lateral extent of the exterior surface 28, 32. Alternatively, the reflector 66 may laterally overlap (along the x-axis and/or the y-axis) a select portion of the exterior surface 28, 32. For example, referring to FIG. 9, the reflector layer 68 may be configured as a strip of material with a lateral width (along the x-axis and/or the y-axis) that is less than the lateral width of the exterior skin 26 and the lateral width of the exterior surface 28, 32. In other embodiments, referring to FIG. 10, the reflector 66 may include one or more (e.g., discrete or interconnected) reflector segments 70. Each of these reflector segments 70 may refocus the microwaves to a respective one of the susceptor segments 54.

Referring to FIG. 8, the remaining skin layer 48F may be configured as a structural layer, a support layer and/or a filler layer. The remaining (e.g., intra-reflector-waveguide) intermediate skin layer 48F may be configured as a layer of the adhesive 50/the matrix material. Of course, in other embodiments, the intermediate skin layer 48F may alternatively be configured as a thin sheet of the reinforcement material embedded within (or otherwise arranged with) the matrix. The present disclosure, however, is not limited to the foregoing exemplary reinforcement or matrix materials.

The reflector layer 68 vertical thickness may be equal to or different (e.g., less or greater) than the vertical thicknesses of any one or more of the remaining skin layers 48.

Figure 11:
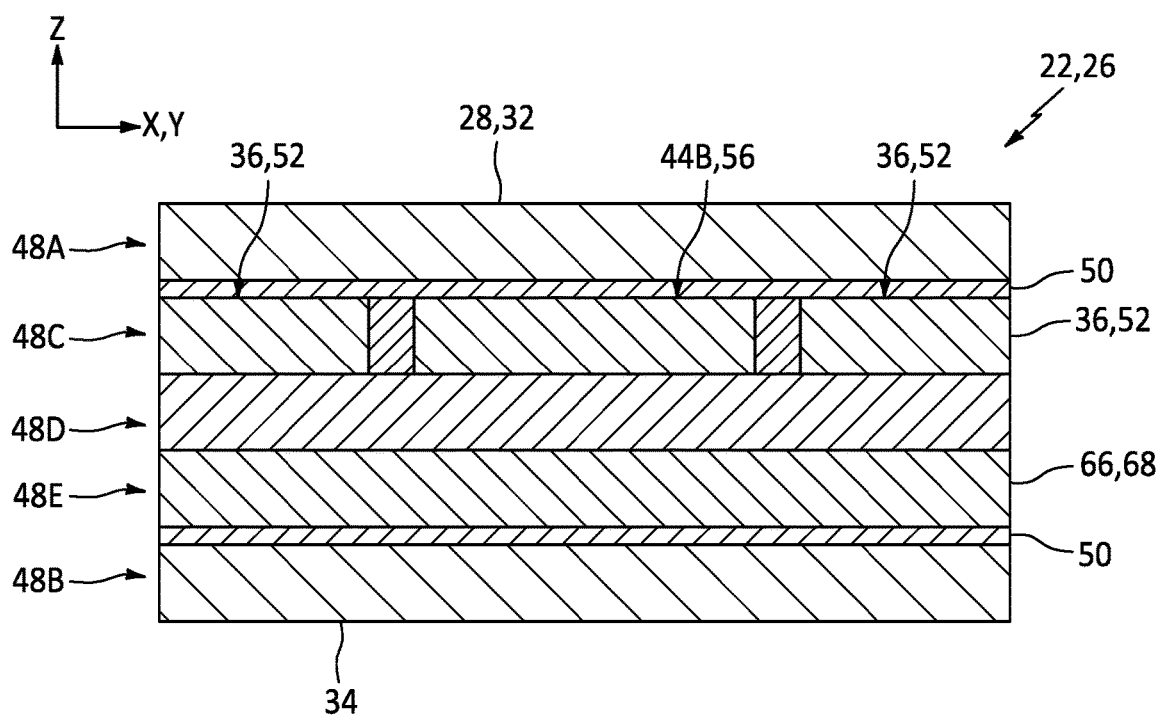

In some embodiments, each of the thermal anti-icing system components 36, 44B and 66 may be formed by or otherwise includes in a discrete one of the skin layers 48 of the exterior skin 26; e.g., see FIGS. 2 and 8. In other embodiments, referring to FIG. 11 for example, two or more of the thermal anti-icing system components (e.g., 36 and 44B) may be configured together/formed in a common one of the skin layers 48. At least one downstream waveguide 44B and one or more of the susceptors 36 (or susceptor segments 54) of FIG. 11, for example, are all arranged in the same intermediate skin layer 48C. The downstream waveguide 44B and the susceptors 36 are vertically aligned/vertically overlap within the exterior skin 26. However, the downstream waveguide 44B is laterally displaced from each of the susceptors 36. The downstream waveguide 44B of FIG. 11, for example, is laterally separated from the susceptors 36 by microwave transparent material; e.g., the adhesive 50, the matrix, etc. The downstream waveguide 44B of FIG. 11 is also located laterally between the susceptors 36. Of course, various other arrangements of the thermal anti-icing system components within the exterior skin 26 are possible and contemplated by the present disclosure.

In some embodiments, the microwave source 40 of FIG. 1 may be tuned to an absorption frequency of the susceptor 36. This may facilitate provision of higher electromagnetic radiation frequencies, while reducing a footprint of the electromagnetic radiation. For example, the microwave source 40 may be tuned for a V-band frequency between forty gigahertz and eighty gigahertz; e.g., between 60 GHz and 77 GHz. Within such a frequency range, absorption by other aircraft structure materials is relatively low and the susceptor 36 may be made relatively small. The susceptor 36, for example, may be about 1.25 mm thick for a microwave transmission frequency of about 60 GHz. The present disclosure, however, is not limited to the forgoing exemplary frequencies or sizes.

In addition to facilitating heating of the exterior skin 26, the thermal anti-icing system 24 of the present disclosure is also relatively resistant to foreign object damage (FOD). For example, during operation, the aircraft structure 22 of FIG. 1 may be subject to a foreign object impact. Under certain conditions, such an impact may crack and/or fracture, inter alia, the susceptor 36; e.g., material within the susceptor layer 52 (e.g., see FIG. 2). Even when cracked/fractured, however, the susceptor 36 may still be operable to transform the microwaves into heat energy since no electrical interconnection within the susceptor 36 is required. Furthermore, provision of the relatively light weight susceptor(s) 36 and waveguide(s) 48, 48B may reduce aircraft weight by obviating the need for ducting and valve associated with a traditional forced hot air anti-icing system.

Figure 12:
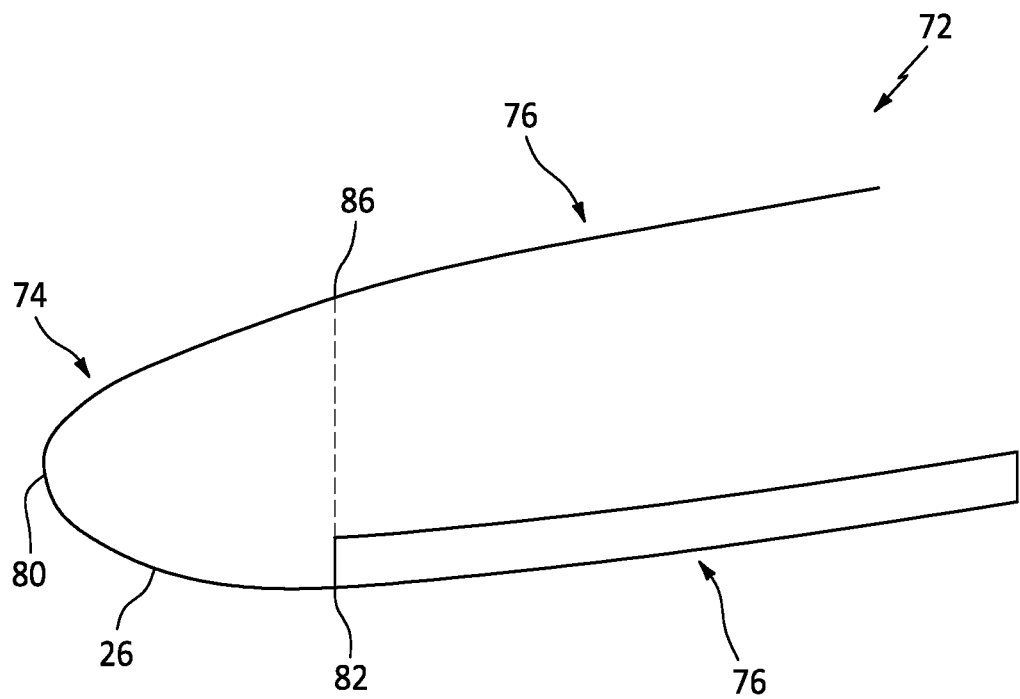
FIG. 12 is a side sectional illustration of a portion of an inlet structure for an aircraft propulsion system nacelle.
Figure 12:

FIG. 12 illustrates an inlet structure 72 of a nacelle for an aircraft propulsion system; e.g., a turbofan or a turbojet propulsion system. This inlet structure 72 includes an inlet lip 74, an inner barrel 76 and an outer barrel 78. The inlet lip 74 forms a leading edge 80 of the inlet structure 72. The inner barrel 76 is connected to a radial inner end 82 of the inlet lip 74, and at least partially forms an outer peripheral boundary of an inlet duct 84 into the aircraft propulsion system. The outer barrel 78 is connected to a radial outer end 86 of the inlet lip 74, and circumscribes the inner barrel 76.

The inlet structure 72 of FIG. 12 is configured with the exterior skin 26. This exterior skin 26 may form at least an inner portion of the inlet lip 74. The exterior skin 26 of FIG. 12, for example, extends axially along an axial centerline 88 of the aircraft propulsion system from (or about) the leading edge 80 to (or towards) the radial inner end 82 of the inlet lip 74. The exterior skin 26 may also extend axially along the axial centerline 88 from (or about) the leading edge 80 to (or towards) the radial outer end 86 of the inlet lip 74. The exterior skin 26 extends circumferentially about (e.g., completely around) the axial centerline 88. Alternatively, the inlet structure 72 may be configured with a plurality of the exterior skins 26, where each exterior skin 26 forms an arcuate segment of the inlet lip 74.

While the exterior skin 26 and the thermal anti-icing system 24 is described above as being configured with the inlet structure 72, the present disclosure is not limited to such an exemplary application. Rather, the exterior skin 26 and the thermal anti-icing system 24 of the present disclosure may be configured with any aircraft structure which would benefit from including de-icing capability. Furthermore, the exterior skin 26 and the thermal anti-icing system 24 of the present disclosure may alternatively be configured for non-aircraft applications. For example, the exterior skin 26 may form an exterior surface of an airfoil such as, but not limited to, a wind turbine blade. In another example, the exterior skin 26 may for an exterior surface of another type of vehicle that would benefit from anti-icing; e.g., an automobile, a boat, etc.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for a structure, comprising:
a composite skin extending between an exterior surface and an interior surface; and
a thermal anti-icing system comprising a susceptor and a waveguide, the susceptor and the waveguide integrated into the composite skin between the exterior surface and the interior surface, and the waveguide configured to direct microwaves to the susceptor for melting and/or preventing ice accumulation on the exterior surface;
the composite skin comprising a plurality of layers, a first of the plurality of layers comprising the susceptor and the waveguide, and the waveguide laterally spaced from the susceptor within the first of the plurality of layers.

2. The assembly of claim 1, wherein the composite skin extends between the exterior surface and the interior surface without interruption.

3. The assembly of claim 1, wherein
the plurality of layers include an exterior layer and an interior layer;
the exterior layer forms the exterior surface;
the interior layer forms the interior surface; and
the first of the plurality of layers is arranged within the composite skin between the interior layer the exterior layer.

4. The assembly of claim 1, wherein
a second of the plurality of layers comprises microwave transparent material; and
the second of the plurality of layers laterally overlaps and is bonded to the susceptor and the waveguide.

5. The assembly of claim 1, wherein at least one of the susceptor or the waveguide comprises metal.

6. The assembly of claim 1, wherein the susceptor comprises fiber reinforcement within a polymer matrix.

7. The assembly of claim 1, wherein the thermal anti-icing system further comprises a reflector configured to reflect microwaves travelling away from the susceptor and the exterior surface back towards the susceptor.

8. The assembly of claim 7, wherein the reflector is integrated into the composite skin between the exterior surface and the interior surface.

9. The assembly of claim 7, wherein the reflector is arranged between the interior surface and the waveguide.

10. The assembly of claim 7, wherein the reflector comprises metal.

11. The assembly of claim 1, wherein the microwaves are transmitted at a frequency between one gigahertz (1 GHz) and ten gigahertz (10 GHz).

12. The assembly of claim 1, wherein the microwaves are transmitted at a frequency between forty gigahertz (40 GHz) and eighty gigahertz (80 GHz).

13. The assembly of claim 1, wherein the microwaves are transmitted at a frequency between twenty gigahertz (20 GHz) and twenty-five gigahertz (25 GHz).

14. The assembly of claim 1, wherein the microwaves are transmitted at a frequency between one-hundred and fifty gigahertz (150 GHz) and two-hundred gigahertz (200 GHz).

15. The assembly of claim 1, further comprising:
a nacelle inlet structure for an aircraft propulsion system;
the nacelle inlet structure comprising the composite skin.

16. An assembly for an aircraft propulsion system, comprising:
a nacelle structure including a skin that forms an exterior surface of the nacelle structure, the skin formed by a plurality of layers of material bonded together, the plurality of layers of material comprising a first layer of material, a second layer of material and a third layer of material, the first layer of material forming the exterior surface of the nacelle structure, and the second layer of material disposed between the first layer of material and the third layer of material; and
a thermal anti-icing system comprising a susceptor and a waveguide, the susceptor formed by at least a portion of the second layer of material, the waveguide formed by at least a portion of the third layer of material, and the waveguide configured to direct microwaves to the susceptor for melting and/or preventing ice accumulation on the exterior surface.

17. An assembly for an aircraft propulsion system, comprising:
a nacelle structure including a skin that forms an exterior surface of the nacelle structure, the skin including a susceptor, a waveguide, a reflector, an exterior layer of material and an interior layer of material, the waveguide disposed between the susceptor and the reflector within the skin, the exterior layer of material forming the exterior surface of the nacelle structure and disposed between the exterior surface of the nacelle structure and the susceptor, and the interior layer of material forming an interior surface of the skin and disposed between the interior surface of the skin and the reflector; and
a thermal anti-icing system configured to direct microwaves through the waveguide to the susceptor for melting and/or preventing ice accumulation on the exterior surface, wherein the reflector is configured to direct stray microwaves back towards the susceptor.

* * * * *